(No Model.) 4 Sheets—Sheet 1.
J. M. MARLIN.
CLUTCH FOR TRICYCLES.
No. 333,531. Patented Jan. 5, 1886.
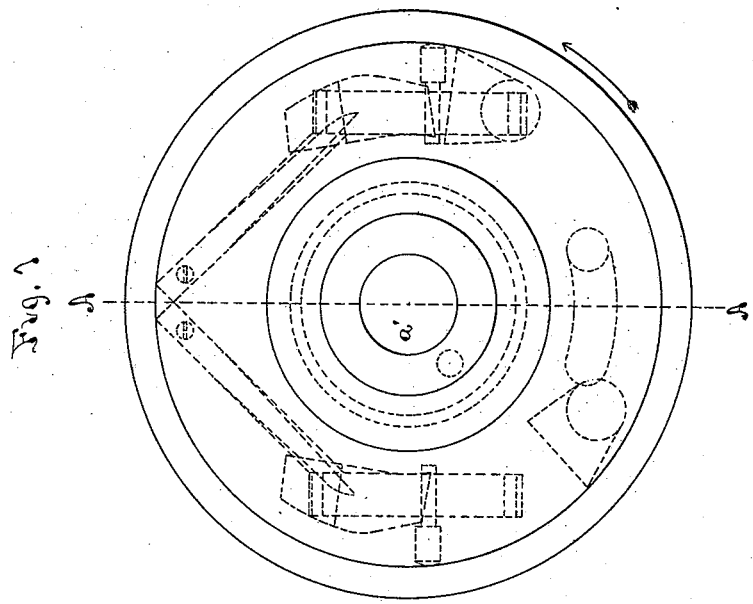
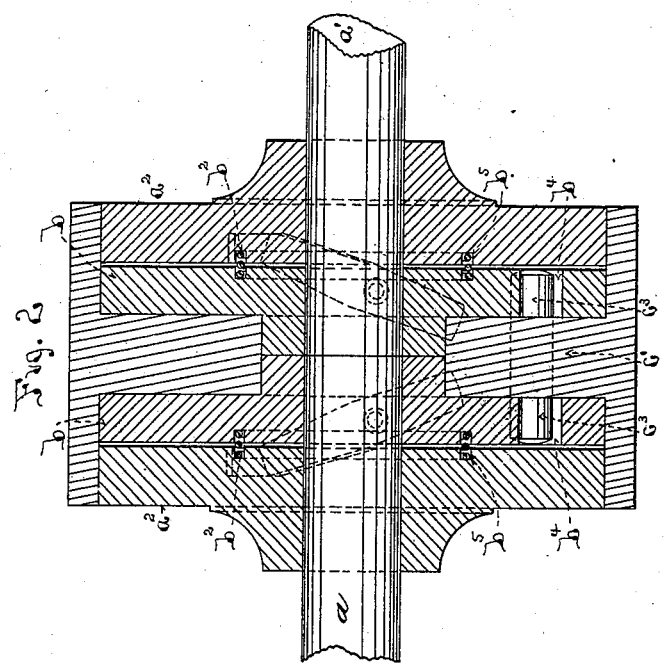
Witnesses
Wm. S. Brown
N. P. Ockington.
Inventor
John M. Marlin
By David Hallsbee
atty.
N. PETERS, Photo-Lithographer, Washington, D. C.

(No Model.)
J. M. MARLIN.
CLUTCH FOR TRICYCLES.
No. 333,531. Patented Jan. 5, 1886.
4 Sheets—Sheet 2.
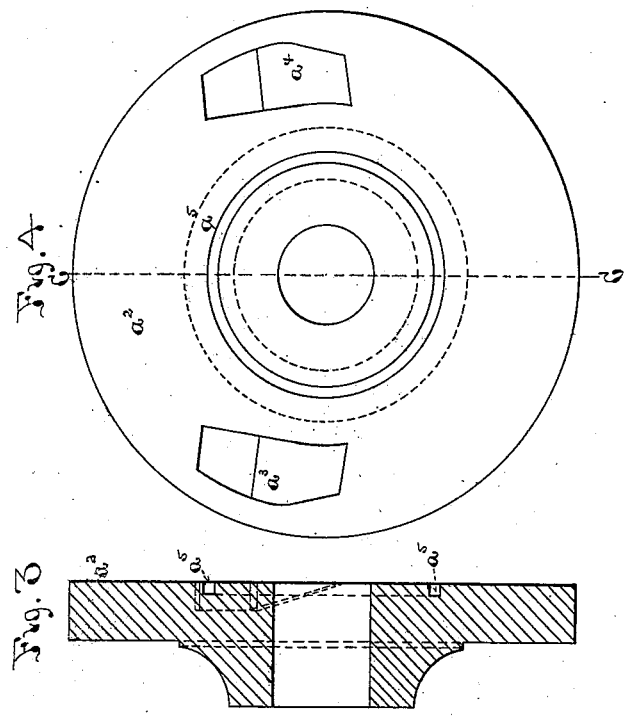

(No Model.) 4 Sheets—Sheet 3.
J. M. MARLIN.
CLUTCH FOR TRICYCLES.
No. 333,531. Patented Jan. 5, 1886.
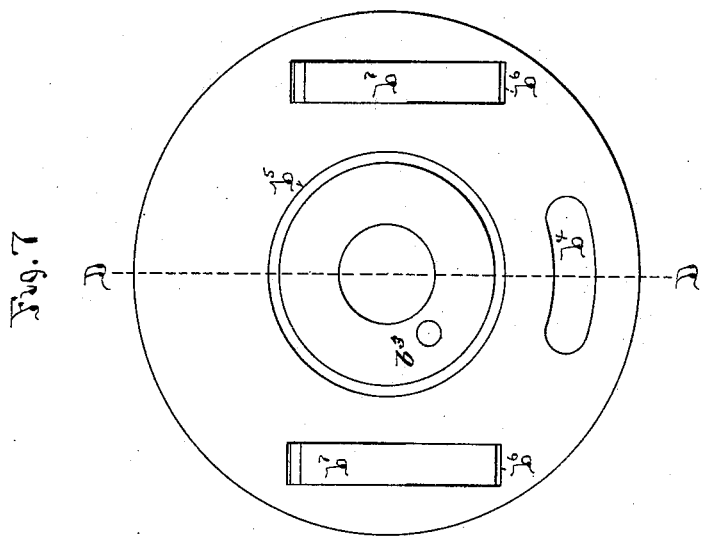
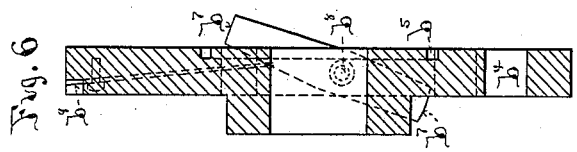
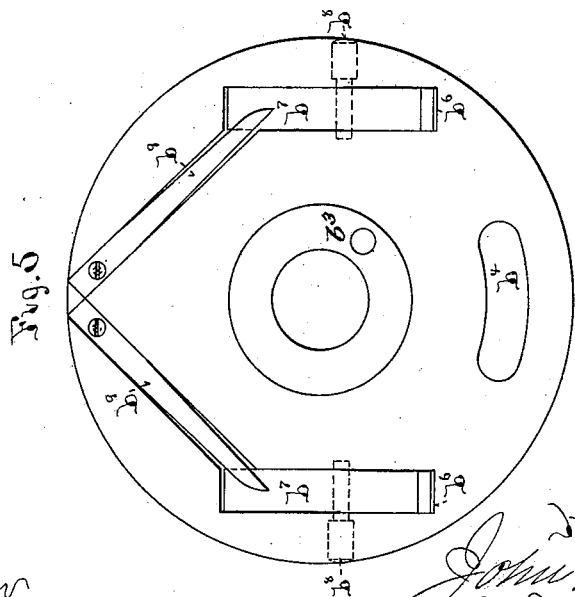

(No Model.) 4 Sheets—Sheet 4.
J. M. MARLIN.
CLUTCH FOR TRICYCLES.
No. 333,531. Patented Jan. 5, 1886.
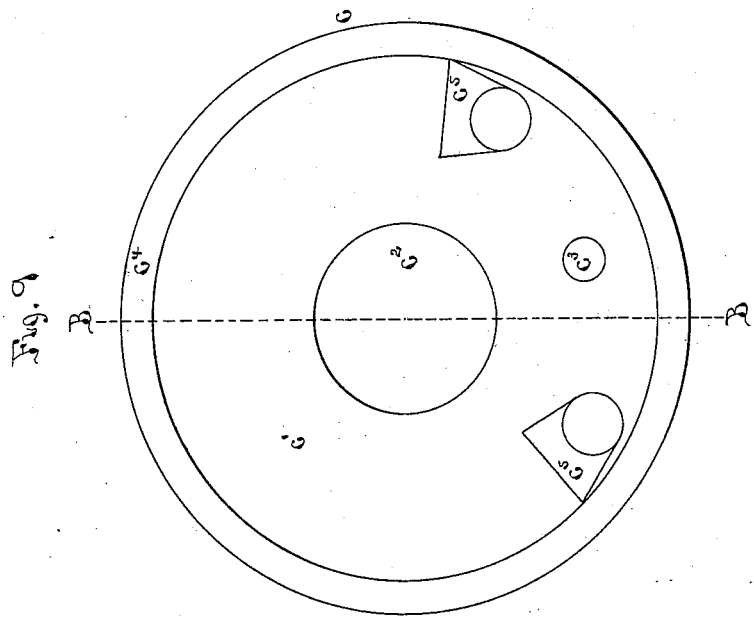
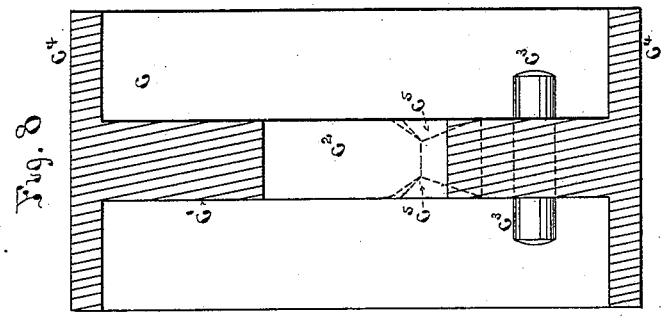
Witnesses
Wm. S. Brown
N. P. Ockington.
Inventor
John M. Marlin,
By David Hall Rice
Atty.

UNITED STATES PATENT OFFICE.

JOHN M. MARLIN, OF NEW HAVEN, CONNECTICUT.

CLUTCH FOR TRICYCLES.

SPECIFICATION forming part of Letters Patent No. 333,531, dated January 5, 1886.

Application filed October 3, 1885. Serial No. 178,883. (No model.)

*To all whom it may concern:*

Be it known that I, JOHN M. MARLIN, of New Haven, in the county of New Haven and State of Connecticut, have invented a new and useful Improvement in Clutches for Tricycle-Shafts, of which the following is a specification.

My invention relates to clutches for shafts, and is designed to be used on tricycles and other similar vehicles where the driving-power is to be so applied as to drive them in either direction, and at the same time allow the division of the shaft on one side of it to run at a greater speed than the division on the other side, by automatically releasing itself from the clutch, being constructed and combined substantially as hereinafter described and claimed.

In the drawings, Figure 1 is an end view of a clutch constructed according to my invention. Fig. 2 is a vertical section through the same on the dotted line A A. Fig. 4 is a face view of the part of the clutch attached to the shaft. Fig. 3 is a section of the same on dotted line C C. Figs. 5 and 7 are respectively opposite face views of the dog-carrying disks of the clutch. Fig. 6 is a section of the same on the dotted line D D of Fig. 7. Fig. 8 is a sectional view of the pulley part of the clutch on the dotted line B B of Fig. 9. Fig. 9 is a face view of the same.

The shaft to which the clutch is attached is divided at the center of the clutch into two divisions, $a$ $a'$. This shaft is supported in suitable bearings of ordinary construction on each side of the clutch, which is attached, for instance, to the tricycle-frame. These bearings form no part of the invention, and need not be described further, as they are well known.

Upon each division $a$ $a'$ of the shaft are keyed or otherwise firmly secured the disks $a^2$ $a^2$. These disks (see Figs. 3 and 4) have cut on their inside faces, on opposite sides of the shaft, notches $a^3$ $a^4$, into which the ends of the driving dogs or pawls lock, as hereinafter described. These notches are so cut that when one of the pawls is adjusted to lock into one, as $a^3$, it will ride over $a^4$, the beveled side of one notch being on one side and that of the other on the other side in traversing around the face of the disk. These disks also have cut in their faces annular recesses $a^5$ $a^5$, to receive spiral pressure-springs, as hereinafter described.

Between the disks $a^2$ $a^2$, upon the divided shaft, are mounted two dog or pawl-carrying disks, $b$ $b$. These pawl-disks revolve freely upon the shaft, and each is provided with a hub on one side surrounding the shaft and extending toward and meeting the hub of the other disk at the center of the clutch, as shown in Fig. 2. These hubs thus form a sleeve around the shaft upon which the pulley part of the clutch is mounted, as hereinafter described.

Directly opposite the annular recesses $a^5$ $a^5$ of disks $a^2$, corresponding annular recesses, $b^5$ $b^5$, are formed in disks $b$ $b$, and spiral springs $b^2$ $b^2$ are placed in these recesses, so as to press upon the disks $b$ and create friction upon the latter, so that it will require considerable force to revolve them upon the shaft $a'$ $a$.

Into the hub parts of the disks $b$ $b$ holes $b^3$ $b^3$, Figs. 5 and 7, are bored, so as to register with each other when they are mounted upon the shaft, and a steel pin long enough to fill both holes is inserted into them, so as to compel both disks to revolve together on the shaft. Each disk also has a circumferential slot, $b^4$, cut through its face. Two slots, $b^6$ $b^6$, parallel to a diameter of each disk, are also made through it from side to side, and in these slots are mounted dogs or pawls $b^7$ $b^7$ on pivots $b^8$ $b^8$. In one face of each disk are also sunk springs $b^9$ $b^9$, which have their free ends bearing upon the opposite ends of the pawls $b^7$ $b^7$ and pressing the latter outward from the face of the disk on one side, which causes the other end of each pawl to project outward from the face of the disk on the opposite side. This arrangement causes one end of one pawl to be pressed outward from the disk $b$ against disk $a^2$, and the other end of the other pawl to be pressed outward against the same face of the same disk, $a^2$. The projecting ends of these pawls are so placed in the disk $b$ as to lie in the same circumferential path as the notches $a^3$ $a^4$ in disk $a^2$; but they are farther apart on said path than the notches, so as to allow of disk $b$ being revolved a limited distance on the shaft and withdrawing one pawl $b^7$ from its notch $a^3$ before the other pawl $b^7$ engages with its notch $b^4$. As both disks $b$ $b$ are made alike, and must revolve together, they withdraw one pair of pawls $b^7$ $b^7$ from the notches $a^3$ in the opposite disks simultaneously when turned around and engage the other pair of pawls with the other notches $b^4$ simultaneously.

The pulley or driving part $c$ of the clutch is mounted, by means of its central web, $c'$, around the hubs of disks $b$ $b$, so as to be capable of revolving thereon, the hubs passing through the hole $c^2$ in this web. A pin, $c^3$, is passed through the web of the hub and fixed, so as to project each side of it, into the opposite circumferential slots, $b^4 b^4$, of disks $b$ $b$. This pin fits loosely in these slots, and thus allows pulley part $c$ to revolve a distance equal to their length independently of disks $b$ $b$; but when the pin reaches either end of the slots it moves the disks $b$ $b$ with the pulley part $c$. The pulley part $c$ has a flange, $c^4$, upon its periphery for a belt; but any other driving device—such as a sprocket-gear or gear-teeth—may be formed upon it, if desired. Two notches, $c^5 c^5$, are cut in each face of the web $c'$. These notches are placed in the path of the pawls $b^7 b^7$ and between the ends of the latter, which project inward toward the web $c'$, not only a distance apart equal (in said path) to that between said projecting ends, less the length of slots $b^4$, but also an equal distance each way from pin $c^3$, or, in other words, so that the latter shall be midway between them. The function of these notches is to allow these bearing ends of the pawls upon web $c'$ to drop into them, and thus project outward against disks $a^2 a^2$. Only one pawl on a side at a time can thus drop in, however, because only one notch $c^5$ is brought under its pawl on a side, when pulley $c$ is turned one way until its pin $c^3$ reaches that end of slots $b^4 b^4$, the other pawl on the same side being shut up within its disk $b$ by the flat face of web $c'$ pressing against it; but when pulley $c$ is turned in the opposite direction, then pin $c^3$ traverses slots $b^4$ to their opposite ends, and withdraws the notches $c^5$ from under the first pair of pawls on one side of it, and shuts them into disks $b$ $b$, and carries the notches $c^5$ on the other side under their pawls, and allows the latter to open out and take into disks $a^2 a^2$.

The operation of the invention is as follows: Suppose the pulley of the clutch to be driven in the direction indicated by the arrow in Fig. 1. Then, as shown in dotted lines, the pin $c^3$ is at the right-hand end of slots $b^4$ and drives the disks $b$ $b$; but the notch $c^5$ in web $c'$ is also under the inner end of pawl $b^7$ on the right-hand side, which allows that pawl to drop its inner end into the notch and its outer end (toward the observer) to bear outward against disk $a^2$ (nearest the observer) and to lock into notch $a^3$ of the latter; but as disk $a^2$ is fast to one division of the shaft this drives the latter, and the same occurs to the other division of the shaft. While in this position suppose one division of the shaft be revolved faster than it is being driven by the clutch. The notches $a^3$ $a^4$ in its attached disk $a^2$ will slide over the pawl on the right-hand side, (the other one being shut into its disk $b$,) and that division of the shaft is free to so run faster. Suppose, next, the motion of pulley $c$ be reversed. It moves pin $c^3$ to the left-hand end of slots $b^4$, withdrawing one notch $c^5$ from beneath the right-hand pawl $b^7$, and closing the latter into its disk $b$, and at the same time it carries its other notch $c^5$ under the left-hand pawl $b^7$, and allows the latter to open and lock into its notch $a^4$ in disk $a^2$, thus driving the shaft $a$ $a'$ in the opposite direction. The reason in reversing the motion of pulley $c$, that its pin $c^3$ moves from one end to the other of slot $b^4$, is that the friction-springs $b^2$ $b^2$ hold disks $b$ $b$ until the pin drives them positively around. I am thus enabled to drive a tricycle forward and backward while allowing either wheel to automatically release itself in turning corners, &c.

It is evident that in case only one member of the shaft, as $a'$, for instance, is to be allowed to turn faster than the pulley $c$, then the latter may be attached solidly to the other member, $a$, of the shaft, and the disk $b$ and its mechanism upon that side be dispensed with.

What I claim as new and of my invention is—

1. The combination of the divided shaft $a$ $a'$, one or more disks, $a^2$, attached thereto, each provided with two pawl teeth or slots, $a^3$ $a^4$, inclined in opposite directions around the shaft, one or more pawl-carrying disks, $b$, each provided with two yielding pawls inclined in opposite directions, and a driving-pulley part, $c$, connected to said disk or disks $b$ by a coupling, permitting a limited independent movement of the same back and forth, and provided with a tripping device for each pawl operated by said independent movement, substantially as described.

2. The combination of divided shaft $a$ $a'$, one or more disks, $a^2$, provided with slots $a^3$ $a^4$, inclined in opposite directions, one or more disks, $b$, provided with oppositely-inclined pawls $b^7$ $b^7$, springs $b^9$ $b^9$, and slot $b^4$, and the pulley part $c$, provided with pin $c^3$ and notches $c^5$ $c^5$, substantially as described.

3. The combination of divided shaft $a$ $a'$, one or more disks, $a^2$, provided with slots $a^3$ $a^4$, inclined in opposite directions, the pressure-spring $b^2$, one or more disks, $b$, provided with opposite-inclined pawls $b^7$ $b^7$, springs $b^9$ $b^9$, and slot $b^4$, and the pulley part $c$, provided with pin $c^3$ and notches $c^5$ $c^5$, substantially as described.

JOHN M. MARLIN.

Witnesses:
C. F. DEMMER,
W. H. KINNEY.